(12) United States Patent
Nix

(10) Patent No.: US 7,106,099 B1
(45) Date of Patent: Sep. 12, 2006

(54) DECISION-FEEDBACK EQUALIZATION CLOCKING APPARATUS AND METHOD

(75) Inventor: Michael A. Nix, Buda, TX (US)

(73) Assignee: Xilinx, Inc., San Jose, CA (US)

( * ) Notice: Subject to any disclaimer, the term of this patent is extended or adjusted under 35 U.S.C. 154(b) by 133 days.

(21) Appl. No.: 10/970,969

(22) Filed: Oct. 22, 2004

(51) Int. Cl.
- G06F 7/38 (2006.01)
- H03K 19/177 (2006.01)
- H03K 5/159 (2006.01)
- H03H 7/30 (2006.01)
- H03H 7/40 (2006.01)

(52) U.S. Cl. ............... 326/40; 326/37; 326/38; 326/39; 326/41; 326/47; 375/233; 341/100; 341/101

(58) Field of Classification Search ........... 326/37–41, 326/47; 375/233; 341/100, 101
See application file for complete search history.

(56) References Cited

U.S. PATENT DOCUMENTS 5,825,701 A * 10/1998 Von Basse et al. ......... 365/203
6,002,713 A * 12/1999 Goldstein et al. .......... 375/222
6,707,850 B1 * 3/2004 Blake et al. ............... 375/233
2004/0091028 A1 * 5/2004 Aronson et al. ........... 375/219
2005/0180498 A1 * 8/2005 Bhakta et al. .............. 375/233
2006/0067440 A1 * 3/2006 Hsu et al. .................. 375/345

OTHER PUBLICATIONS

U.S. Appl. No. 10/837,185, filed Apr. 30, 2004, Nix.

* cited by examiner

Primary Examiner—Rexford Barnie
Assistant Examiner—Dylan White
(74) Attorney, Agent, or Firm—Scott Hewett (57) ABSTRACT

A decision feedback equalization ("DFE") technique is suitable for use in a serializer-deserializer ("SERDES") receiver in an integrated circuit (IC). The IC has a summing node coupled to a return-to-zero ("RTZ") data latch register. The RTZ data latch register has a first ("even") series of RTZ data latches and a second ("odd") series of RTZ data latches. A first even tap is coupled to the first even RTZ data latch and provides a feedback signal to the summing node on a first portion of a local clock cycle. A first odd tap is coupled to the first odd RTZ data latch and provides an odd feedback signal to the summing node on a second portion of the local clock cycle.

17 Claims, 6 Drawing Sheets

DECISION-FEEDBACK EQUALIZATION CLOCKING APPARATUS AND METHOD

FIELD OF THE INVENTION

The invention relates generally to clocking digital data, and more particularly to decision-feedback equalization ("DFE") techniques used in receivers.

BACKGROUND OF THE INVENTION

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In some CPLDs, configuration data is stored on-chip in non-volatile memory. In other CPLDs, configuration data is stored on-chip in non-volatile memory, then downloaded to volatile memory as part of an initial configuration sequence.

For all of these programmable logic devices (PLDs), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

PLDs are used extensively in digital systems. In some systems, PLDs are configured to receive and/or transmit high-speed a digital data stream from and to other digital devices in the system along a data channel ("channel"). An ideal incoming digital data stream would have a series of square-wave-type pulses with vertical leading and trailing edges and flat ideal. However, incoming digital data streams are not perfect. Deviation from ideality can be caused by frequency-dependent attenuation of the channel over which the data is transmitted. For example, if the channel, such as a wire trace on a printed circuit board or transmission line, presents more attenuation at higher frequencies than at lower frequencies, phase distortion of the incoming digital data stream can occur.

Inter-symbol interference ("ISI") causes bits in a data stream to become less ideal. Each bit of incoming data is "stretched" by its adjacent bits and other bits in the data stream. The resultant incoming digital data stream has pulses with sloped leading and trailing edges and rounded corners. For example, the first bit adds a small amount of voltage to the second bit to produce a summed waveform that is unlike either the first or second bit.

At the end of a long serial data communication, such as occur in systems with serializer/de-serializer ("SERDES") receivers, the incoming waveform might not look like the waveform that was sent from the data transmitting device. SERDES receivers are used in PLDs, such as FPGAs. One way to compensate for the changes in the incoming waveform is to apply decision-feedback equalization ("DFE"). DFE applies a selected correction signal (e.g. voltage or current) to an input bit at a summing node that compensates for the frequency-dependent attenuation of the channel carrying the data to the receiver. In some systems, DFE is essentially the inverse function of the channel attenuation as a function of frequency.

DFE techniques use sampled data from the incoming digital data stream and feeds the sampled data back into the data stream based on the frequency response of the data channel. Linear devices, such as linear gain amplifiers, provide a selected amount of feedback. In other words, the feedback is provided as an analog signal, not as a digital (rail-to-rail) signal.

However, typical architectures for clocking the data in DFE circuits introduce a large load on the high-speed clock, or add delay to the data feedback path. The high-speed clock is typically about 5 GHz or more, and refers to the clock used in the DFE circuit, not the incoming data rate (e.g. 10 GHz), which is often twice the rate of the high-speed clock (e.g. 5 GHz). It is desirable to provide DFE to incoming digital data streams that put a smaller load on the high-speed clock and/or consume less power to operate and/or have less delay in the data feedback path. Less delay in the data feedback path allows the correction signal to be summed with the incoming data sooner, resulting in more accurate equalization or higher speed operation.

SUMMARY OF THE INVENTION

A decision feedback equalization ("DFE") technique is suitable for use in a serializer-deserializer ("SERDES") receiver in an Integrated circuit (IC), for example, an application specific IC or a field-programmable gate array ("FPGA") or other programmable logic device ("PLD"). The IC has a summing node coupled to a return-to-zero ("RTZ") data latch register. The RTZ data latch register has a first even RTZ data latch and a first odd RTZ data latch. A first even tap is coupled to the first even RTZ data latch and provides an even feedback signal to the summing node on a first portion of a local clock cycle. A first odd tap is coupled to the first odd RTZ data latch and provides an odd feedback signal to the summing node on a second portion of the local clock cycle.

DETAILED DESCRIPTION OF THE DRAWINGS

Figure 1A:
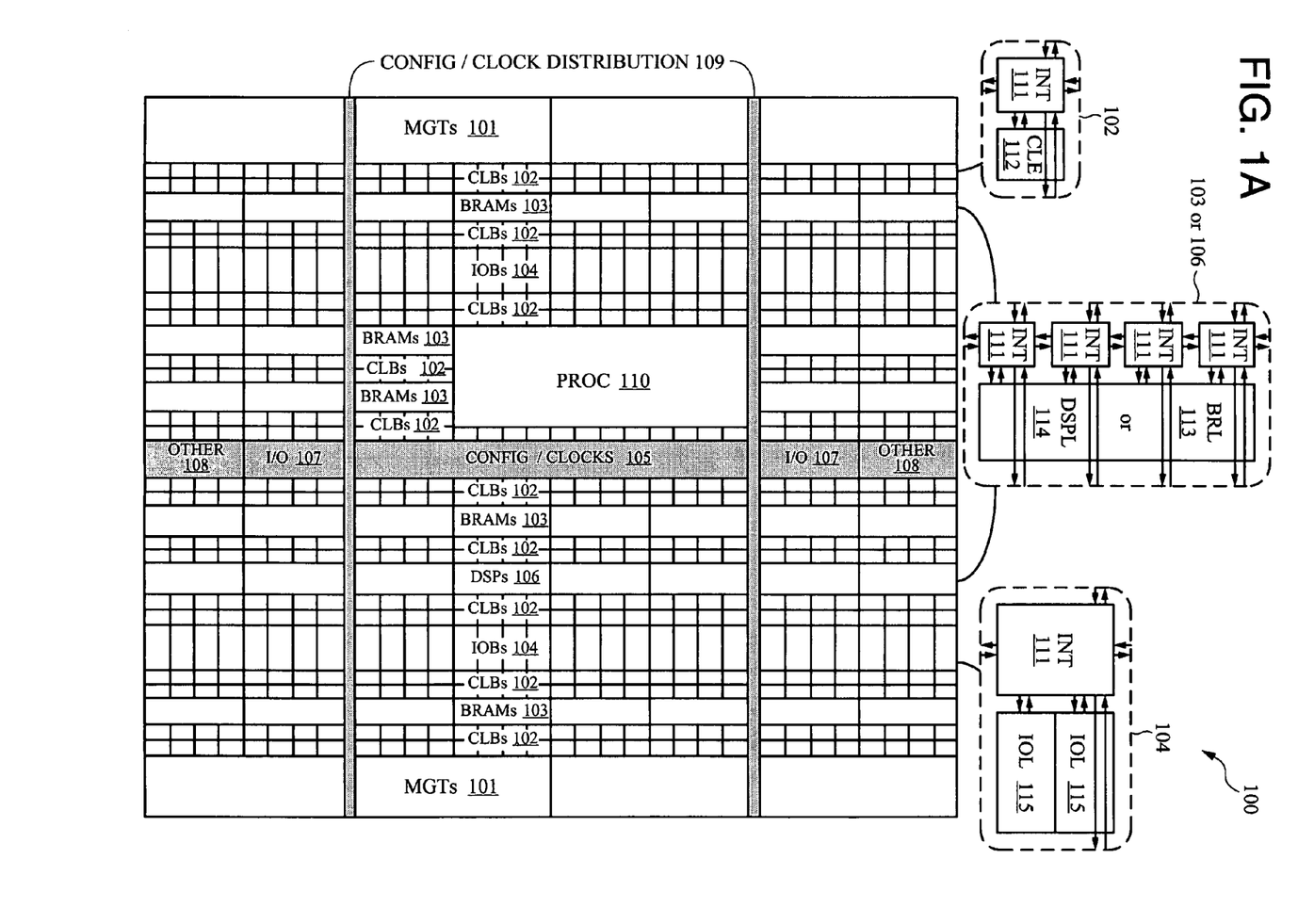
FIG. 1A illustrates an FPGA architecture that includes a large number of different programmable tiles including multi-gigabit transceivers (MGTs), configurable logic blocks (CLBs), random access memory blocks (BRAMs), input/output blocks (IOBs), configuration and clocking logic (CONFIG/CLOCKS), digital signal processing blocks (DSPs), specialized input/output blocks (I/O) (e.g., configuration ports and clock ports), and other programmable logic such as digital clock managers, analog-to-digital converters, system monitoring logic, and so forth.

Advanced FPGAs can include several different types of programmable logic blocks in the array. For example, FIG. 1A illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth. Some FPGAs also include dedicated processor blocks (PROC 110).

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1A.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 1A) is used for configuration, clock, and other control logic. Horizontal areas 109 extending from this column are used to distribute the clocks and configuration signals across the breadth of the FPGA.

Some FPGAs utilizing the architecture illustrated in FIG. 1A include additional logic blocks that disrupt the regular columnar structure making up a large part of the FPGA. The additional logic blocks can be programmable blocks and/or dedicated logic. For example, the processor block PROC 110 shown in FIG. 1A spans several columns of CLBs and BRAMs.

Note that FIG. 1A is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1A are purely exemplary. For example, in an actual FPGA more than one adjacent column of CLBs is typically included wherever the CLBs appear, to facilitate the efficient implementation of user logic.

Figure 1B:
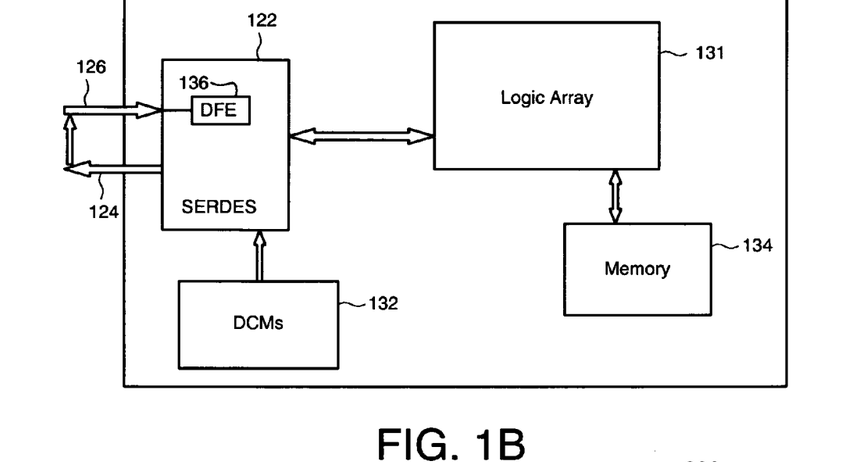
FIG. 1B is a block diagram of an FPGA with a SERDES receiver.

FIG. 1B is a block diagram of an FPGA 120 with a SERDES receiver 122. The SERDES receiver 122 can be part of a Multi-gigabit transceiver (MGT) 101 in FIG. 1A. The SERDES receiver 122 is coupled to external devices (not shown) with external transmit 124 and receive 126 channels. The SERDES receiver 122 is coupled to a logic array 131, which is coupled to a memory 134 of the FPGA 120. Digital clock manager circuits 132 are coupled to the SERDES receiver 122 and other logic circuits (not shown) to provide transmit and receive clock signals. The SERDES receiver 122 includes a DFE system 136. Alternatively, a DFE system is included elsewhere within the FPGA 120.

Figure 2A:
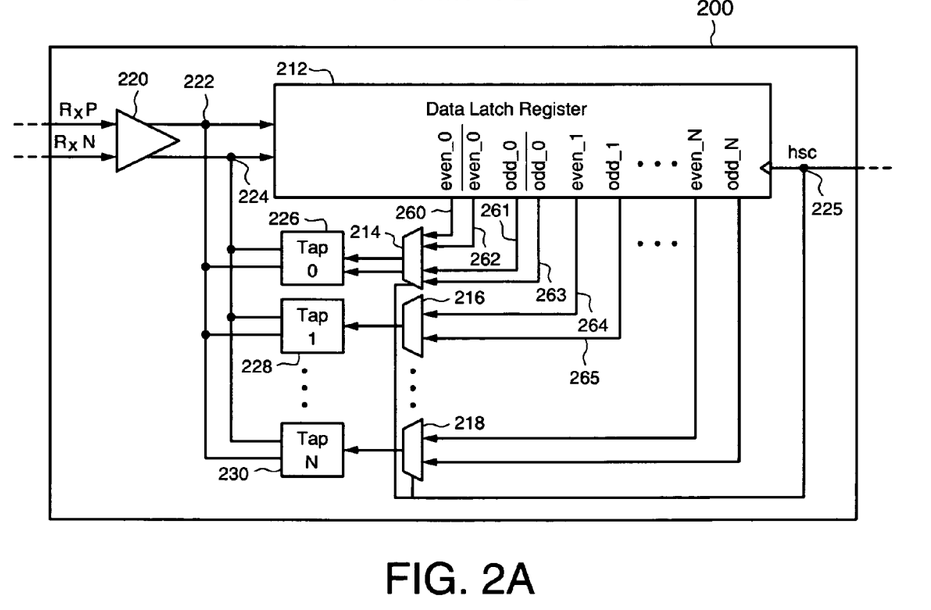
FIG. 2A is a simplified diagram of a DFE system using switch-and-hold data latches in a data latch register and 2:1 multiplexers.

FIG. 2A is a simplified diagram of a DFE system 200 using sample-and-hold data latches (see FIG. 2B) in a data latch register 212 and 2:1 multiplexers 214, 216, 218. An input buffer 220 receives differential input data RxP, RxN from a transmitter (see, e.g., FIG. 1B, ref. num. 126). The differential input data RxP, RxN have opposite values, for example, if RxP has a value of "1", then RxN has a value of "0". After the input buffer 220, the data at summing nodes 222, 224 are treated as analog values. That is, the level(s) of the data at the summing nodes 222, 224 is adjusted.

The data latches (see FIG. 2B, ref. nums. 250, 251, 252, 253, 254, 255) in the data latch register 212 pipeline the incoming data using a high-speed clock ("hsc") 225. The hsc 225 is a local clock that runs at half the rate of the incoming data, and the DFE system 200 is referred to as a half-rate clock system.

Half-rate clock systems operate off of both the rising and falling edges (or high and low thresholds) of the hsc 225. Thus, if the incoming data has a clock rate of 10 GHz, the hsc has a clock rate of 5 GHz. The hsc 225 is typically generated by a local clock circuit (see FIG. 1B, ref. num. 132) that recovers the clock rate from the incoming data stream and generates the hsc 225. Half-rate systems are desirable for use with integrated circuits that might not reliably support the full clock rate of the incoming data, but that reliably operate at half that frequency.

Figure 2B:
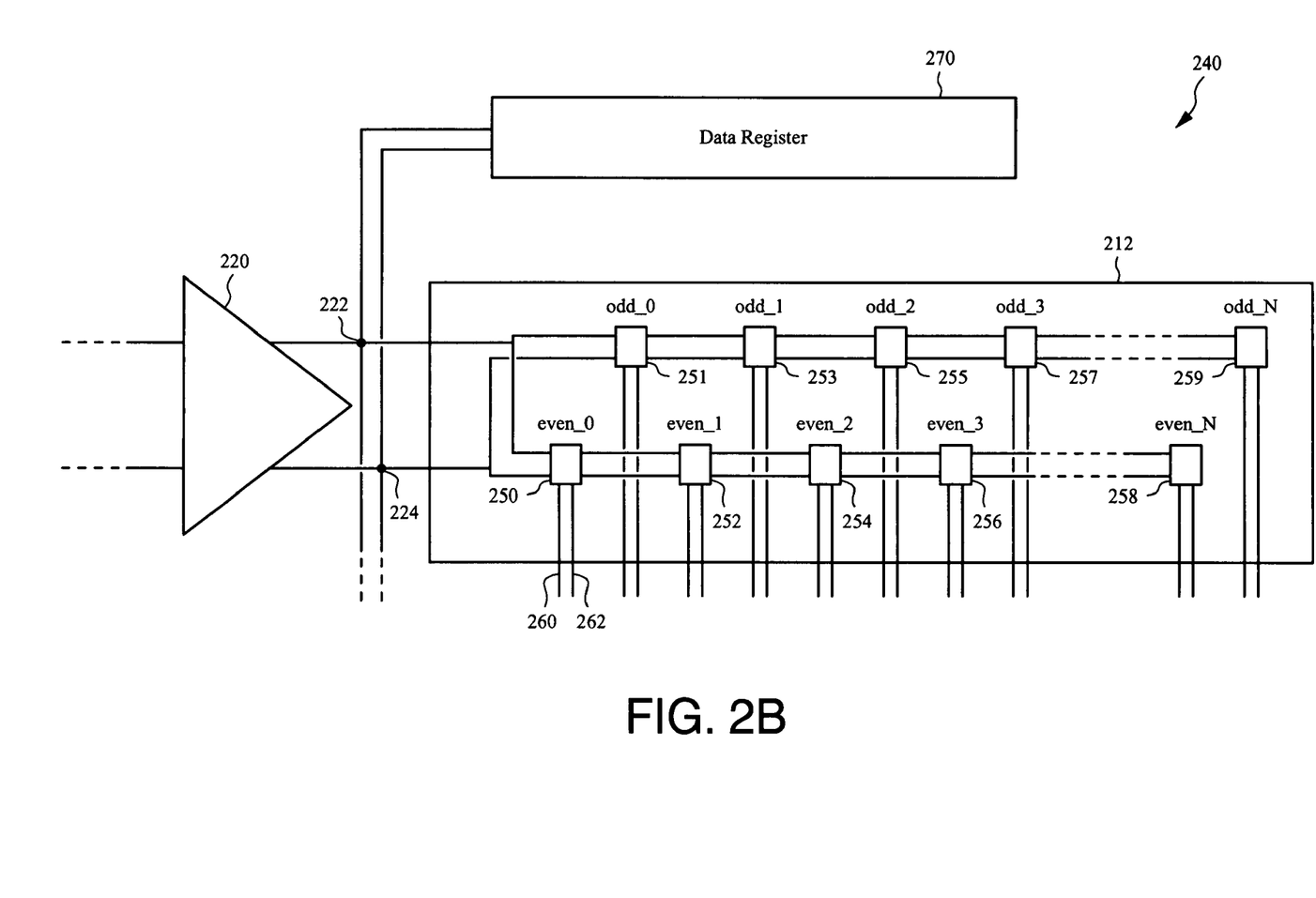
FIG. 2B is a simplified diagram of a portion of the DFE system of FIG. 2A.

FIG. 2B is a simplified diagram of a portion 240 of the DFE system of FIG. 2A. The data latch register 212 has several data latches 250, 251, 252, 253, 254, 255 (only a few of which are shown). Half of the data latches 250, 252, 254 are in a first series and are arbitrarily designated "even" latches, and half the data latches 251, 253, 255 are in a second series and are arbitrarily designated "odd" latches. The latches are sample-and-hold in the embodiment of FIG. 2A, but could be another type of data latch, such as a return-to-zero ("RTZ") data latch, as in the embodiment of FIG. 4A.

The differential input data value(s) are coupled to the summing nodes 222, 224 through the buffer 220. The input data values are coupled to the first (even) series of data latches 250, 252, 254 and to the second (odd) series of data latches 251, 253, 255 in an alternating fashion. Every other latch in the even data latch series (e.g. even_0 and even_2, see FIG. 2B, ref. nums. 250,254) in the data latch register 212 operate on a first phase of the hsc clock cycle (e.g. the "high" or rising clock signal) and the corresponding data latches in the odd data latch series (e.g. odd_0 and odd_2, see FIG. 2B, ref. nums. 251 255) operate on a second phase of the hsc clock cycle (e.g. the "low" or falling clock signal), or vice versa. The other latches in the even data latch series (e.g. even_1 and even_3, see FIG. 2B, ref. nums. 252, 256) also operate on the second phase of the hsc clock cycle, and the other latches in the odd data latch series (e.g. odd_1 and odd_3, see FIG. 2B, ref. nums. 253, 257) also operate on the first phase of the hsc clock cycle. Thus, an incoming data stream at a data rate is captured by the data latch register clocked by the hsc running at half the data rate.

It is common to refer to latches in a register in their order in a series. For example, the first even latch 250 is referred to as the "even_0" ("even-zero") latch, the second latch 252 as the even_1 latch, and so on to the last latch 258, which is referred to as the even_N latch, where N is an integer and there are N+1 latches in the series. The number of data latches in the data latch register 212 is chosen to be sufficient to provide a feedback signal at the summing nodes 222, 224 that substantially compensates for ISI, which can be affected by both the data pattern and the transmission characteristics of the channel (not shown).

FIG. 2B shows how differential data values are coupled to, and output from, the data latches. Referring to the even_0 data latch 250, an even_0 data latch output 260 and an even_0-bar (pronounced "even-zero-bar") data latch output 262 are provided by the latch. It is common in the representation of digital designs to represent differential values as a single line, in other words, to not show two lines representing each differential value because those of skill in the art understand the simplified representation of representing differential values with a single line. Similarly, alternative embodiments operate using a single-sided (i.e. non-differential) data value for one or more operations. If differential data values are subsequently desired, an inverter may be used to provide a complementary data value that, in conjunction with the single-sided data value, provides differential data values.

The current differential data values (i.e. the ones present at the summing nodes 222, 224) are adjusted with feedback signals according to the data latch outputs (see generally, FIG. 2A). The adjusted data values are coupled into the even and odd series of data latches in the data latch register 212. The adjusted data values are also coupled to a data register 270 for further processing by a circuit, such as other applications in the logic array 131 of the FPGA 120 of FIG. 1B. Alternatively, the adjusted data values are output from the data latch register 212 for further processing, or the adjusted data values are coupled from the summing nodes 222, 224 to a functional block other than the data register 270.

The first (even) series of data latches 250, 252, 254, 256, 258 operates with the second (odd) series of data latches 251, 253, 255, 257, 259 to capture the incoming data stream. That is, the even_0 data latch 250, holds the data value immediately preceding the current data value present at the summing nodes, the odd_0 data latch 251 holds the data value before that, the even_1 data latch 252 holds the data value before that, and so forth.

Referring again to FIG. 2A, in the case of the first multiplexer 214, the even_0 data latch output 260 represents the data bit (e.g. RxP) immediately preceding the data value present at a summing node (e.g. summing node 222), and the even_0-bar data latch output 262 (illustrated with an overscore) represents the differential data value (e.g. RxN) present at the other summing node (e.g. summing node 224). The odd_0 data latch represents the data bit preceding the data bit in the even_0 data latch, and so forth. Differential data outputs are shown only for the first multiplexer 214 in FIG. 2A. Differential data outputs are omitted in the subsequent multiplexer paths for simplicity and clarity of illustration, as is known in the art.

Pipelining the data in series of even and odd data latches allows using a half-rate clock system to capture all the data in the incoming data stream. The multiplexers 214, 216, 218, which also operate off the hsc 225, bring the data rate into the taps 226, 228, 230 back up to 10 GHz by passing alternating even and alternating odd latch values during a first phase of the hsc 25, and passing the other alternating even and other alternating odd latch values during a second phase of the hsc 225. During a first phase of the hsc 225 (e.g., on the leading edge of the hsc) essentially half the even latches and half the odd latches are coupled through the multiplexers to the taps (i.e. enabled), and on a second phase of the hsc 225, (e.g. on the trailing edge of the hsc) the other half of the even latches and other half of the odd latches are coupled through the multiplexers to the taps. The input buffer 220 operates in conjunction with the data latch register 212 to apply the even and odd feedback signals to the incoming data RxP, RxN at the summing nodes 222, 224.

The taps 226, 228, 230 are individually settable analog circuits, such as a linear amplifier or programmable current source. A tap often has a nominal value and can be set to a value on either side of the nominal value. For example, a tap has an output of 1 V±200 mV. Other taps are single-sided. In one embodiment, the taps are linear amplifiers with individually variable gain that is selected according the desired amount of feedback for the associated data latch output.

There are various ways to determine the desired amount of feedback for a tap. One way is to repeatedly modify the gain of the tap to optimize the DFE in a digital system or simulator. Another technique is to characterize the channel between the transmitting device (not shown) and the input buffer 220 or the summing nodes 222, 224, and set the gain of the taps to provide the desired compensation for the loss in the channel. Typically, the taps operating from the more recent data latches (e.g. even_0 and odd_0) have more gain than the taps operating from the less recent data latches (e.g. even_N and odd_N). This is because recent data values typically have a greater effect on the current data value. The outputs of the taps 226, 228, 230 are summed with the current data value(s) at the summing nodes 222, 224 to provide the DFE.

Figure 3:
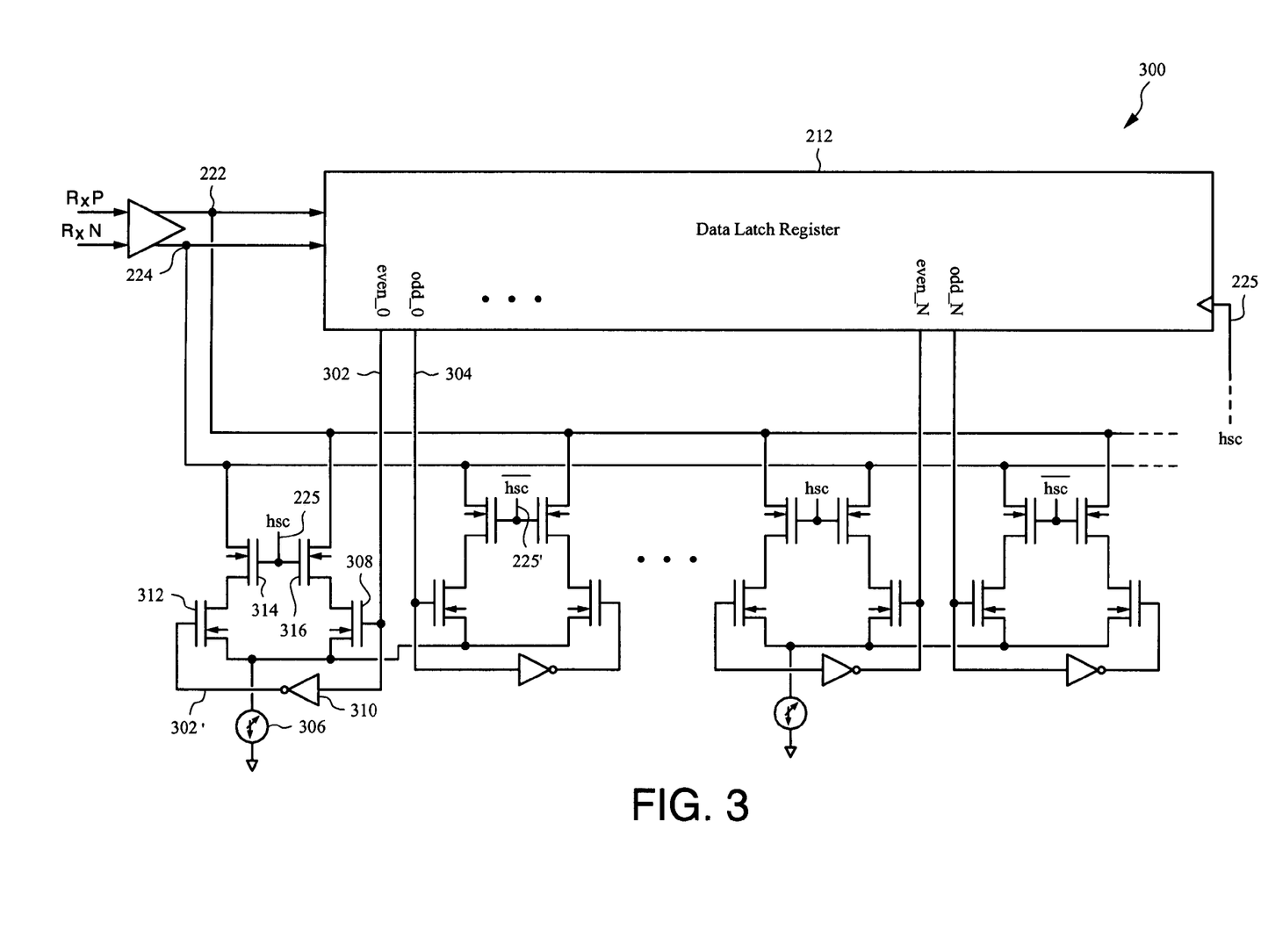
FIG. 3 is a simplified schematic of another DFE system using switch-and-hold data latches.

FIG. 3 is a simplified schematic of another DFE system 300 using sample-and-hold data latches. As described above, the even_0 latch output 302 the odd_0 latch output 304 represent the data value immediately preceding the data value ("current data value") present at the summing nodes 222, 224 pipelined in the data latch register. The integer "N" is selected to provide the appropriate feedback to the summing nodes 222, 224.

In this example, multiplexing of the feedback signals is done after the taps. An adjustable current source 306 is the tap for both the even_0 data latch output 302 and the odd_0 data latch output 304 on alternate portions of the hsc 225 cycle. The even_0 data latch output 302 is provided to a first field-effect transistor ("FET") 308, inverted by an inverter 310, and the inverted even_0 data latch output 302' is provided to a second FET 312. Either even_0 data latch output 302 turns on the first FET 308 or the inverted even_0 data latch output 302' turns on the second FET 312. Thus, the adjustable current source 306 is coupled to the summing nodes 222, 224 when hsc 225 is high, which turns on a third FET 314 and a fourth FET 316.

The odd_0 data latch output 304 is clocked by hsc-bar 225', which is the inverse of hsc 225. In other words, when hsc 225 is high, hsc-bar 225' is low, and vice versa. Thus, when hsc 225 is low, for example, the even_0 data latch output 302 is decoupled from the summing nodes 222, 224, and hsc-bar 225' is high, which allows coupling the odd_0 data latch output 304 to the summing nodes 222, 224.

Figure 4A:
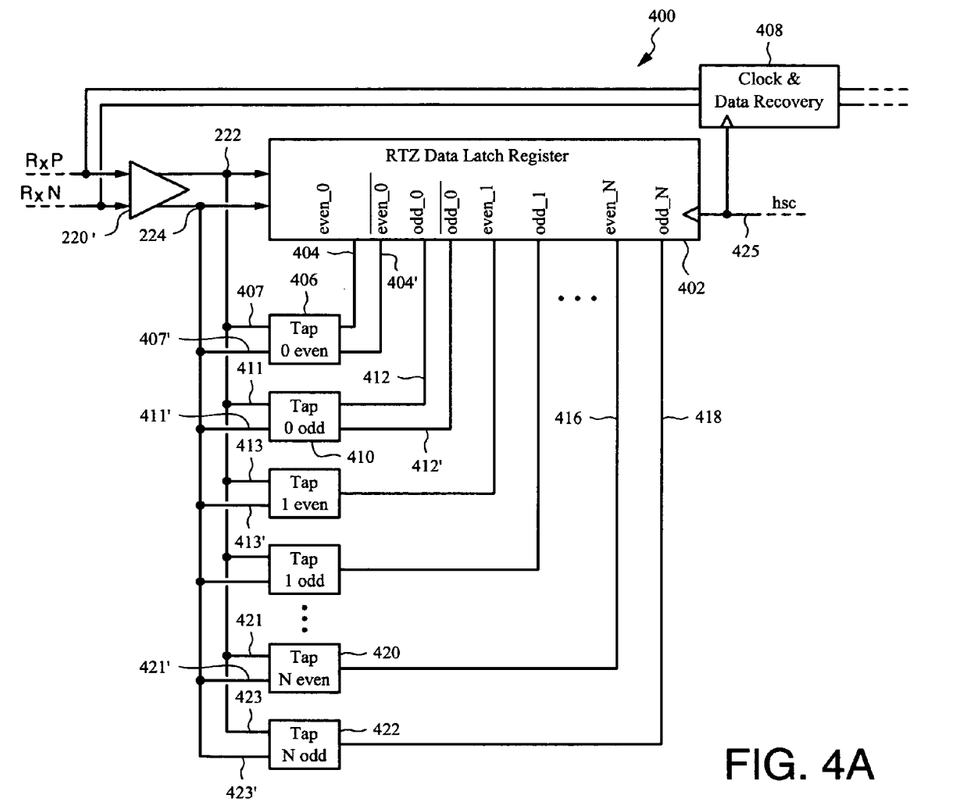
FIG. 4A is a simplified schematic of a DFE system using return-to-zero ("RTZ") data latches in an RTZ data latch register.

FIG. 4A is a simplified schematic of a DFE system 400 using return-to-zero ("RTZ") data latches in an RTZ data latch register 402. In a particular embodiment, the DFE system is incorporated in a PLD, such as an FPGA (see FIG. 1A, ref. num. 100). The RTZ data latches are not separately shown, but are essentially configured as in FIG. 2B. RTZ latches rapidly return to a zero condition, rather than maintaining a digital data value that a sample-and-hold type latch must purge before transitioning (switching) to a new digital data value (i.e. from a "1" value to a "0" value).

RTZ latches are much faster than sample-and-hold latches when transitioning between data values, but are slower if no change in the data state occurs. In a DFE system, ISI is typically most pronounced when adjacent data values change state, so faster operation of RTZ latches in these circumstances is advantageous. RTZ latches typically return to a zero or near-zero condition in about 10–15 pico-seconds ("ps"), which is typically much faster than the incoming data clock rate. Thus, the first even RTZ data latch output (even_0) 404 and the inverse first even RTZ data latch output (even_0-bar) 404' can provide feedback through the first tap 406 to the data bit present at the summing nodes 222, 224.

A clock/data recovery ("CDR") circuit, also called a local clock circuit, 408 used with the RTZ data latch register 402 is designed to operate with RTZ latches because the data value is not maintained by the RTZ latch. More information on how RTZ devices operate is found in co-pending U.S. patent application Ser. no. 10/837,185, entitled HIGH-SPEED DIFFERENTIAL FLIP-FLOP WITH COMMON-MODE STABILIZATION, by Michael A. nix, filed on Apr. 30, 2004, the disclosure of which is incorporated herein by reference for all purposes. Generally, a flip-flop is similar to a latch, but a flip-flop is typically edge-triggered, while a latch is level-sensitive.

As with the example described above in conjunction with FIGS. 2A and 2B, during one phase of the hsc 425, half of the even RTZ data latch outputs and taps and half of the odd RTZ data latch outputs and taps are valid (i.e. fed back to the summing nodes 222, 224). During a second phase of the hsc 425, the other half of the even RTZ data latch outputs and the other half of the odd RTZ data latch outputs and taps are valid. Therefore, multiplexers (see FIG. 2, ref. nums. 214, 216, 218) are not used in this embodiment to get back to the incoming data rate. In a sense, the multiplexing function is "built in" to the operation of the RTZ latches in the RTZ data latch register 402.

The first even tap 406 is shown coupled to both an even_0 RTZ data latch output 404 and an even_0-bar RTZ data latch output 404', and a first odd tap 410 is shown coupled to both an odd_0 RTZ data latch output 412 and an odd_0-bar RTZ data latch output 412'. As described above in conjunction with FIG. 2A, differential signals are common in digital techniques, and illustration of complimentary differential outputs are omitted from subsequent RTZ data latches and taps for simplicity and clarity. Alternatively, differential signals are not used, but rather, only a unitary signal (e.g. even_0 404 or even_0-bar 404') is used, such as with a tap that includes an inverter on its input to internally generate the differential signal.

The data values present at the summing nodes 222, 224 receive feedback signals 407, 407', 421, 421' through the even RTZ data latches (ref. FIG. 2B) and taps (e.g. even taps 406, 420) when enabled by a first portion (i.e. half cycle) of the hsc 425. Alternatively, the last even tap in the series, N_even tap 420, is enabled on a second portion of the hsc. The feedback signals 407, 407' from the first even tap 406 form a differential feedback signal provided to the summing nodes 222, 224. The taps are adjustable-gain amplifiers, or alternatively adjustable voltage supplies or adjustable current supplies, digital-to-analog ("DAC") implementation, or other type of analog gain control that might be used in a closed-loop control system.

Similarly, previous data bits are fed back through additional RTZ latches (ref. FIG. 2B) and taps, with the last latch output being even_N RTZ data latch output 416, and the last even tap 420, where N is an integer selected to provide the desired number of bits (taps) in the DFE system. The combination of the series of even RTZ data latches and the series of odd RTZ data latches preserves the preceding N+1 data values, corrected with their feedback signals, so each incoming data value is compensated by the appropriate number of preceding data values and their associated taps whether the hsc 425 is on the even half cycle or odd half cycle. Additionally, each data value present at the summing nodes 222, 224 is corrected with a feedback signal from the immediately preceding data value because the even_0 data latch or the odd_0 RTZ data latch is enabled on alternating half-cycles of the hsc.

On another portion (i.e. the other half cycle) of the hsc 425, the odd_0 RTZ data latch provides feedback signals 411, 411', the odd_N RTZ data latch provides feedback signals 423, 423', and the next even RTZ latch, even_1, provides feedback signals 413, 413' to the next data value ("next data value") present at the summing nodes 222, 224, on the next portion of the hsc clock cycle.

As the next data value becomes present at the summing nodes 222, 224, the preceding corrected data value, i.e., the data value that was corrected with the feedback signal from the even_0, etc., RTZ data latches and taps, is fed back to the data value present at the summing nodes 222, 224 through the odd_0, etc., RTZ data latches. Similarly, previous data bits are fed back through additional even and odd RTZ latches (ref. FIG. 2B) and taps, with the last latch output being odd_N RTZ data latch output 418, and the last odd tap 422, where N is an integer selected to provide the desired number of bits (taps) in the DFE system.

For example, where N=2, six taps would be used (even_0, odd_0, even_1, odd_1, and even_2, odd_2). There is one tap for each even RTZ data latch, and one tap for each odd RTZ data latch. The DFE system 200 of FIG. 2A uses only three taps 226, 228, 230 where N=2 because the even and odd data latch outputs are multiplexed by the multiplexers 214, 216, 218. The additional taps of the DFE system of FIG. 4A add a slight additional load on the input buffer 220'. The buffer driving the summing nodes 222, 224 is designed, in part, based on the load applied by the DFE circuit. However, loading of the hsc is reduced by avoiding additional multiplexers (compare FIG. 2A, 214, 216, 218), which are driven by the hsc. Delay is reduced when changing states on the input by using RTZ data latches. Thus, the speed of the feedback loop is greatly improved using RTZ data latches, as in the DFE system 400 of FIG. 4A, with decreased clock loading, less complicated routing, and lower parasitics typically associated with designing sample-and-hold data latch registers coupled to multiplexers operating in high-speed DFE systems.

Figure 4B:
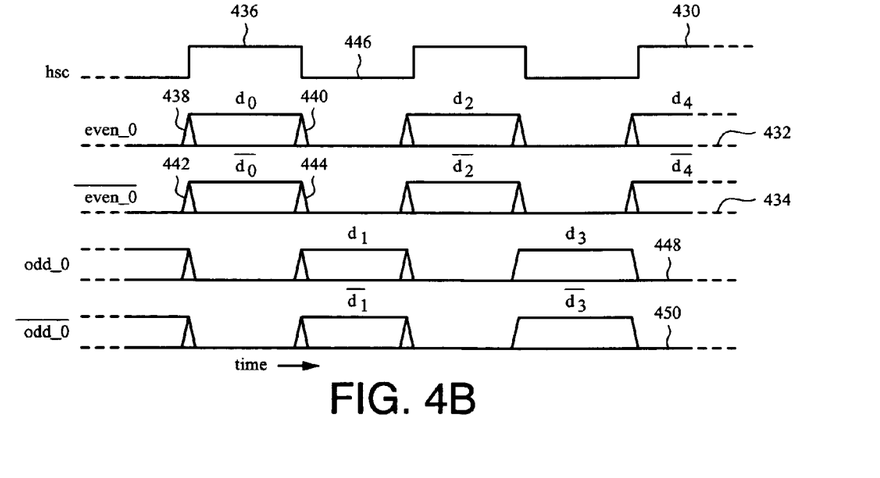
FIG. 4B is a series of waveforms (voltage versus time) for a clocking technique for DFE in a front end of a receiver.

FIG. 4B is a series of waveforms (voltage versus time) for a clocking technique for DFE in a front end of a receiver. In a particular embodiment, the feedback taps (see, e.g., FIG. 4A, ref. nums. 406, 410) use only n-channel devices so that when an RTZ latch is in its reset (zero) state, its corresponding feedback tap is deactivated. The first plot 430 shows the state of the hsc (see FIG. 4A, ref. num. 425) as a function of time. The next plot 432 shows the even_0 RTZ data latch output (see FIG. 4A, ref. num. 404). The next plot 434 shows the even_0-bar RTZ data latch output (see FIG. 4A, ref. num. 404') as a function of time.

During a first portion of the hsc clock period (e.g. at ref. num. 436), either even_0 is either high or low, depending on the design, and even_0-bar is in the opposite state, thus providing a differential input to the first even tap (see FIG. 4A, ref. num. 406). This condition is represented by the corners 438, 440, 442, 444 that show a slope (from perpendicular) indicating a time lag between the clock edge and that the data latch could occupy either state. The tap 406 in FIG. 4A operates off of differential input signals. During a second portion of the hsc clock period (e.g. ref. num. 446), both even_0 and even_0-bar are in the same state, in this case low. When hsc is low, differential signals are not supplied to the tap from even_0 and even_0-bar.

The next plot 448 shows the odd_0 RTZ data latch output (see FIG. 4A, ref. num. 412) and the final plot 450 shows the odd_0-bar RTZ data latch output (see FIG. 4A, ref. num. 412'). When hsc is low (e.g. ref. num. 446), odd_0 is either high or low and odd_0-bar is in the opposite state, thus providing differential inputs to the first odd tap 410 in FIG. 4A.

Figure 5:
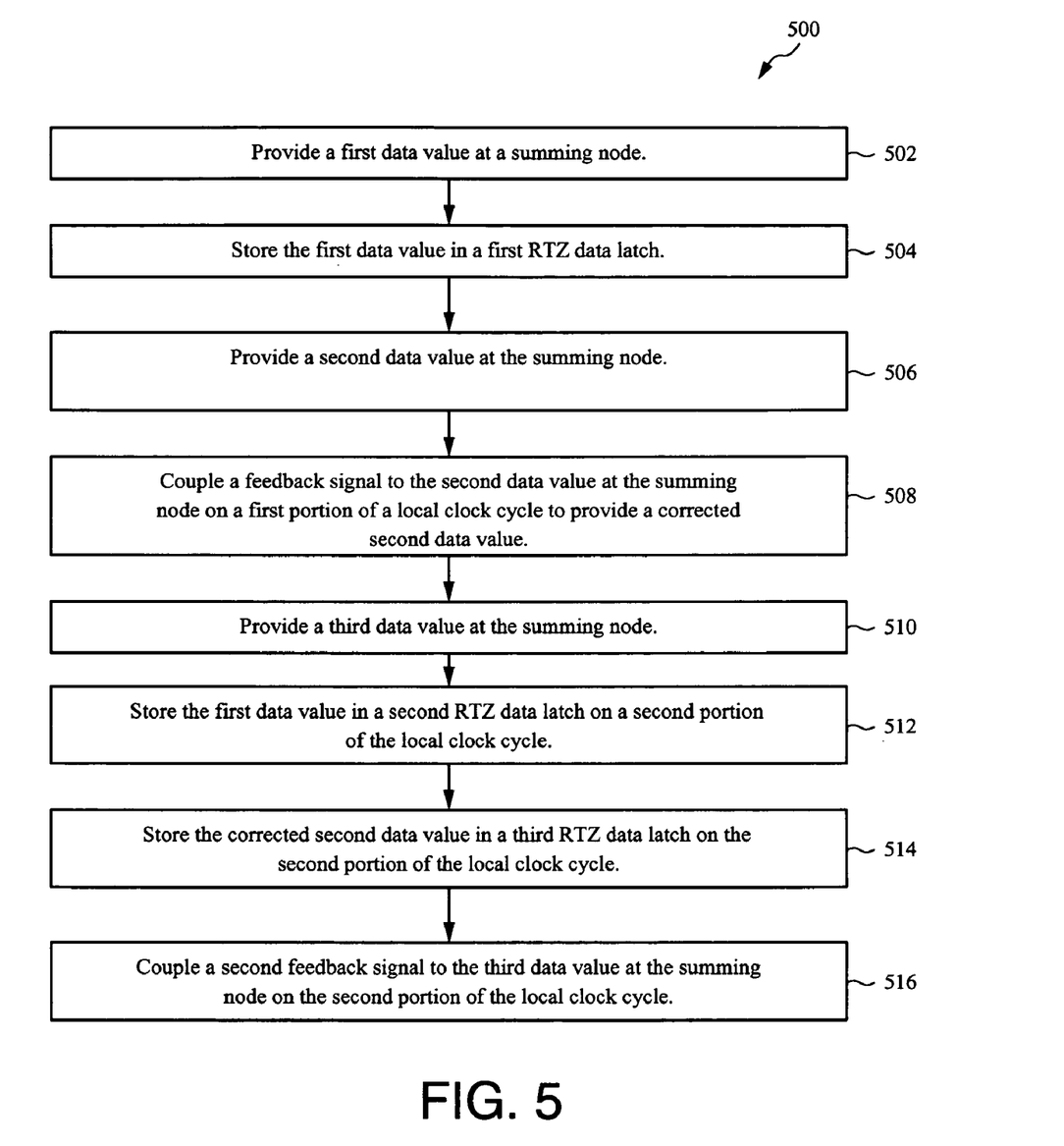
FIG. 5 is a simplified flow chart of a method of providing DFE in a PLD.

FIG. 5 is a simplified flow chart of a method 500 of providing DFE in a PLD. A first data value in a data stream is provided at a summing node (step 502) and stored in a first RTZ data latch on a first portion of a local clock (e.g. hsc) cycle (step 504). A second data value, following the first data value in the data stream, is provided at the summing node (step 506). A feedback signal is coupled to the second data value at the summing node (step 508) on the first portion of the local clock cycle from a first tap coupled to the first RTZ data latch to provide a corrected second data value.

In a further embodiment, a third data value is provided at the summing node (step 510), the first data value is stored in a second RTZ data latch (step 512), and the corrected second data value is stored in a third RTZ data latch (step 514) on a second portion of the local clock cycle. A second feedback signal is coupled to the third data value at the summing node (step 516) on the second portion of the local clock cycle. In a particular embodiment, the second feedback signal includes a first portion from a third tap coupled to the third RTZ data latch and a second portion from one or more additional taps coupled to additional RTZ data latches holding additional corrected data values that preceded the third data value in the data stream.

In the above detailed description, reference is made to the accompanying drawings that show specific embodiments. While these embodiments are described in sufficient detail to enable those skilled in the art to practice the invention, it is understood that other embodiments may be utilized and that changes may be made to the embodiments without departing from the scope of the present invention. Therefore, the above detailed description and associated drawings are not to be taken as limiting, the scope of the invention being defined only by the following claims.

The invention claimed is:

1. An integrated circuit (IC) comprising:
   a summing node;
   a return-to-zero ("RTZ") data latch register coupled to the summing node and having
      a first even RTZ data latch, and
      a first odd RTZ data latch;
   a first even tap coupled to the first even RTZ data latch configured to provide an even feedback signal to the summing node on a first portion of a local clock cycle; and
   a first odd tap coupled to the first odd RTZ data latch configured to provide an odd feedback signal to the summing node on a second portion of the local clock cycle.

2. The IC of claim 1 wherein the IC is a field-programmable gate array.

3. The IC of claim 1 wherein the RTZ data latch register further comprises a first series of N+1 RTZ data latches and a second series of N+1 odd RTZ data latches, wherein N is an integer selected to provide a feedback signal at the summing node sufficient to compensate for inter-symbol interference of a data value provided to the summing node.

4. The IC of claim 3 further comprising N+1 taps individually coupled to the first series of N+1 data latches and N+1 taps individually coupled to the second series of N+1 data latches, wherein each of the taps are coupled to both the first summing node and to a second summing node.

5. The IC of claim 1 wherein the first portion of the local clock cycle is a first portion of a high-speed clock cycle on the IC and the second portion of the local clock cycle is a second portion of the high-speed clock cycle.

6. The IC of claim 1 further comprising a local clock circuit wherein the IC is configured to receive a data input stream at an input data rate and the local clock circuit provides the local clock cycle at half of the input data rate.

7. The IC of claim 1 further comprising a second summing node and wherein the even feedback signal is provided as a differential feedback signal to the summing node and to the second summing node.

8. The IC of claim 1 further comprising an input buffer configured to provide a data value to the summing node.

9. The IC of claim 1 wherein the first even RTZ data latch provides a first even latch output and an inverse first even latch output to the first even tap.

10. The IC of claim 1 wherein the first even tap comprises an adjustable current source.

11. The IC of claim 1 wherein the first even tap comprises an amplifier with adjustable gain.

12. A field-programmable gate array ("FPGA") comprising:
   an input buffer configured to receive a data stream of differential input data values;
   a first summing node coupled to the input buffer;
   a second summing node coupled to the input buffer;
   a return-to-zero ("RTZ") data latch register having
      a first series of N+1 RTZ data latches, and
      a second series of N+1 RTZ data latches; and
   N+1 taps individually coupled to the first series of N+1 data latches and N+1 taps individually coupled to the second series of N+1 data latches, wherein each of the 2N+2 taps are coupled to both the first summing node and to the second summing node.

13. A method of providing decision feedback equalization in a programmable logic device ("PLD") comprising:
   providing a first data value in a data stream to a summing node of the PLD;
   storing the first data value in a first return-to-zero ("RTZ") data latch on a first portion of a local clock cycle;
   providing a second data value in the data stream to the summing node of the PLD; and
   coupling a feedback signal to the second data value at the summing node on the first portion of the local clock cycle from a first tap coupled to the first RTZ data latch to provide a corrected second data value.

14. The method of claim 13 wherein an input data stream is provided to the summing node at a rate, and a local clock circuit operates at half the rate to provide the local clock cycle.

15. The method of claim 13 further comprising:
   providing a third data value to the summing node;
   storing the first data value in a second RTZ data latch coupled to a second tap;
   storing the corrected second data value in a third RTZ data latch on a second portion of the local clock cycle; and
   coupling a second feedback signal to the third data value at the summing node on the second portion of the local clock cycle, wherein the second feedback signal includes at least a first feedback signal portion from a third tap coupled to the third RTZ data latch.

16. A decision feedback equalization system in a serializer-deserializer receiver comprising:
   means for providing a data value to a summing node;
   means for coupling corrected prior data values to a first series and to a second series of return-to-zero ("RTZ") data latches;
   means for generating a feedback signal according to at least a portion of the corrected prior data values.

17. The decision feedback equalization system of claim 16 wherein the serializer-deserializer receiver is part of a multi-gigabit transceiver.

* * * * *